Figure 2:
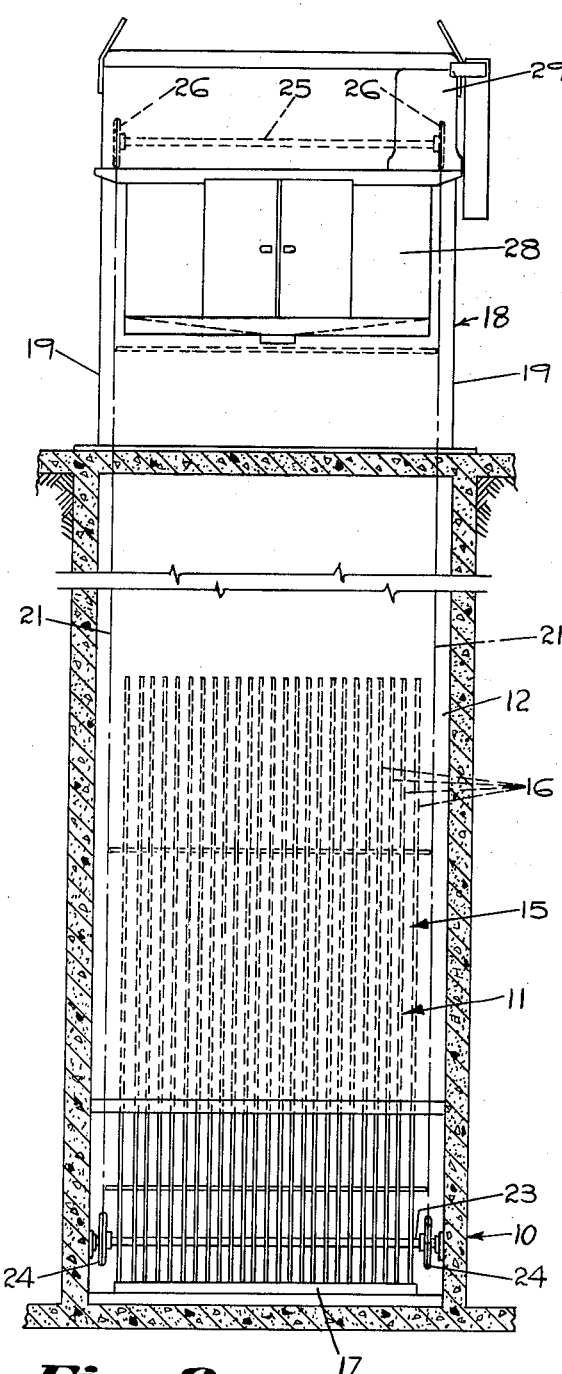

Aug. 11, 1964 W. P. CRISE 3,144,406
WIPER MECHANISM FOR SCREENING APPARATUS
Filed Feb. 16, 1960 4 Sheets-Sheet 1

INVENTOR;
WILFORD P. CRISE,
BY David Young
ATT'Y.

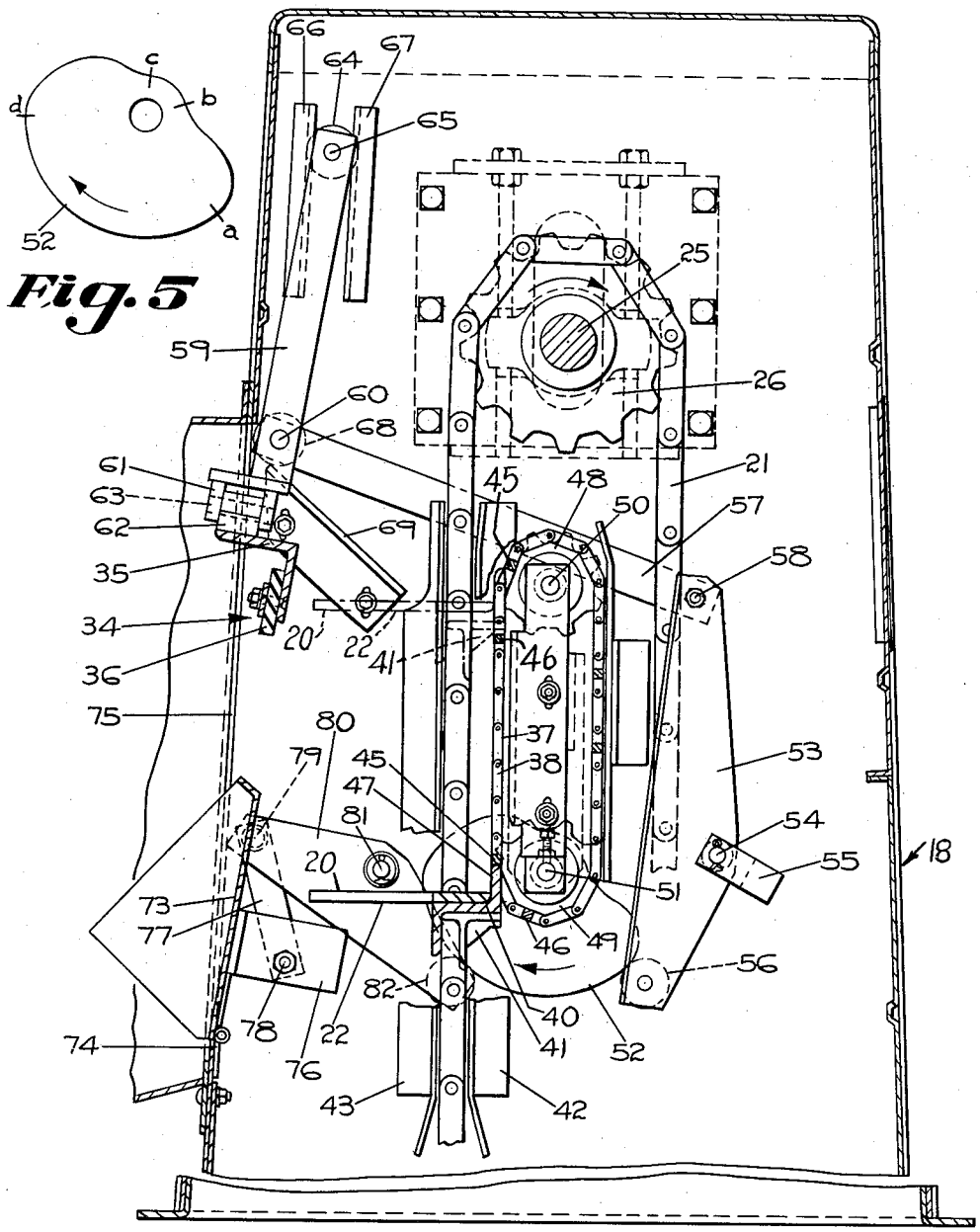

INVENTOR;
WILFORD P. CRISE,
BY David Young
ATT'Y.

INVENTOR;
WILFORD P. CRISE,
BY David Young
ATTY.

United States Patent Office 3,144,406
Patented Aug. 11, 1964

---

3,144,406
WIPER MECHANISM FOR SCREENING APPARATUS
Wilford P. Crise, Columbus, Ohio, assignor, by mesne assignments, to Jeffrey Galion Manufacturing Company, a corporation of Ohio
Filed Feb. 16, 1960, Ser. No. 9,011
5 Claims. (Cl. 210—159)

The instant invention relates to a screening apparatus such as is used particularly in sewage treatment plants, and which includes a bar screen disposed in the path of flow of the stream of water to trap refuse, branches and other such materials which are carried by the stream of water. There is provided a rake which is moved over the bar screen to remove the trapped materials from the bar screen and to carry these materials beyond the bar screen for discharge. By the instant invention there is provided an improved wiper mechanism including a wiper, which is drawn across the rake after the latter has passed beyond the bar screen, to remove the materials from the rake for discharge of the same to a suitable collection point.

It is an object of the instant invention to provide an improved wiper mechanism in a screening apparatus for clearing the rake of materials.

It is another object of the instant invention to provide an improved wiper mechanism in a screening apparatus for clearing the rake of materials, in which the operation of the wiper is initiated by movement of the rake.

It is a further object of the instant invention to provide an improved wiper mechanism in a screening apparatus for clearing the rake of materials, in which the wiper is operated to be drawn across the rake for clearing the materials from the rake, with the operation of the wiper mechanism being timed to draw the wiper across the rake during continued movement of the latter, and the wiper being moved to a position beyond the path of movement of the rake to permit the rake to pass beyond the wiper.

It is also an object of the instant invention to provide an improved wiper mechanism in a screening apparatus for clearing the rake of materials, in which there is provided an operating mechanism to draw the wiper across the rake as the rake continues its movement, with the operating mechanism moving the rake to a position clear of the path of movement of the rake to permit the rake to move past the wiper.

Still another object of the instant invention is to provide an improved wiper mechanism in a screening apparatus for clearing the rake of materials, in which there is provided an operating mechanism to draw the wiper across the rake, with the wiper being engaged by the rake with the latter moving the wiper along the path of movement of the rake, and there also being provided means for constraining the movement of the wiper in the direction of movement of the rake.

Still another object of the instant invention is to provide an improved wiper mechanism in a screening apparatus for clearing the rake of materials, including an operating mechanism to draw the wiper across the rake with the operating mechanism being driven by an endless chain drive, and the rake and endless chain drive including interengaging means for operation of the endless chain drive by the rake.

A still further object of the instant invention is to provide an improved wiper mechanism in a screening apparatus for clearing the rake of materials, in which there is provided a deflector plate which is normally maintained out of the path of movement of the rake and having an operating mechanism for moving the deflector plate into the path of movement of the rake behind the rake for discharge of material from the rake by the wiper mechanism onto the deflector plate.

Other objects of the invention will appear hereinafter, the novel features and combinations being set forth in the appended claims.

Figure 1:
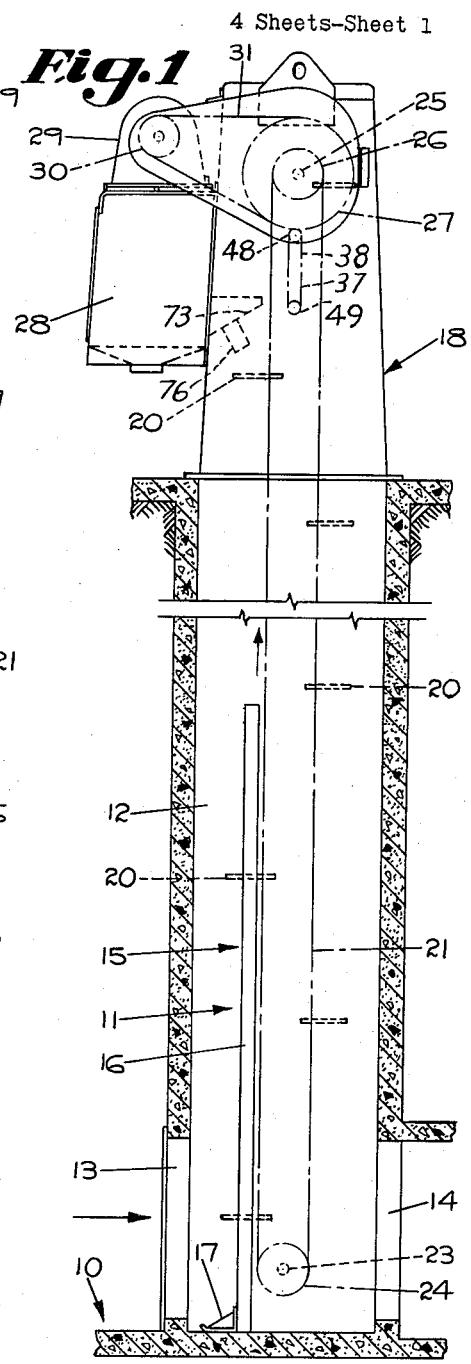
Figure 4:
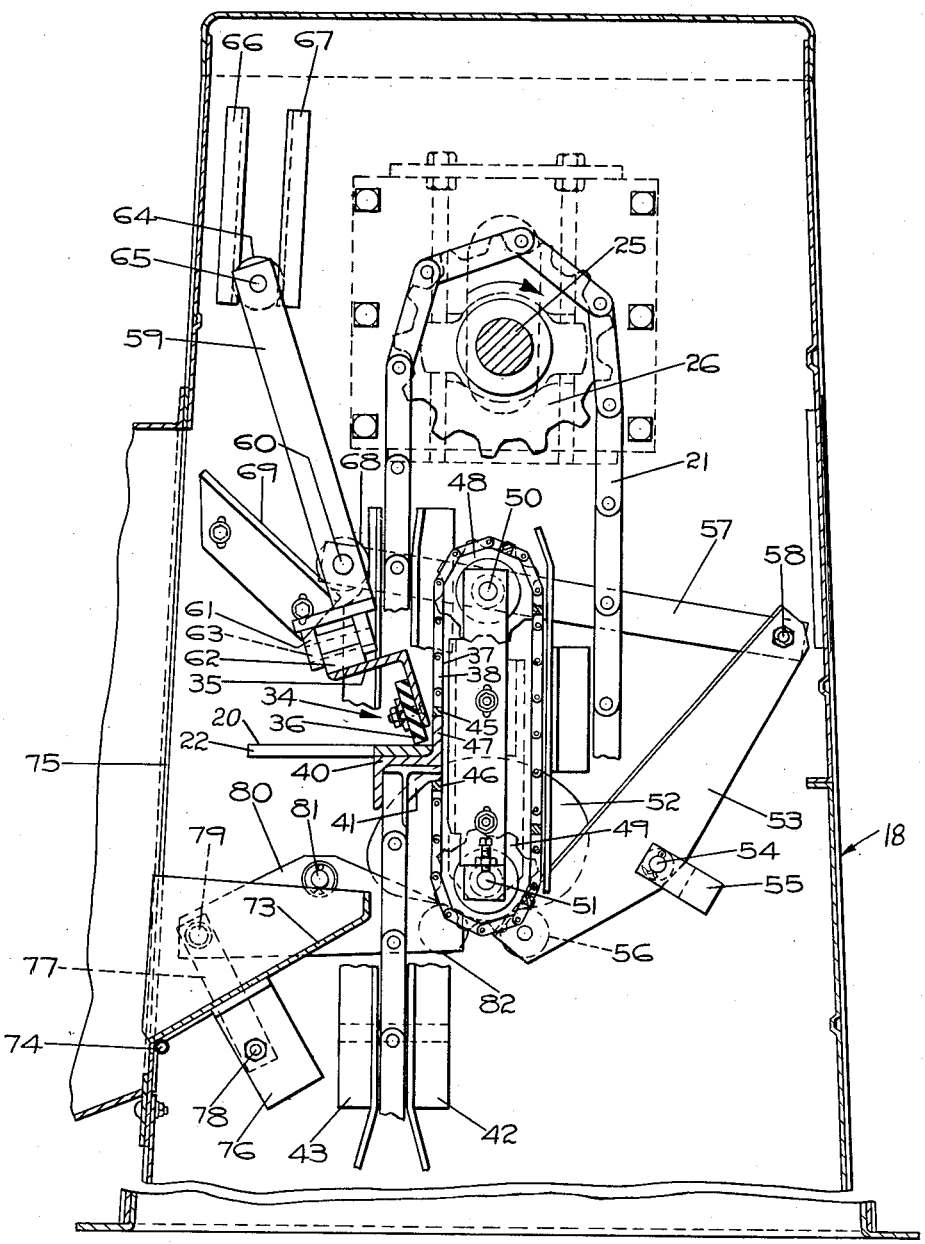
Figure 6:
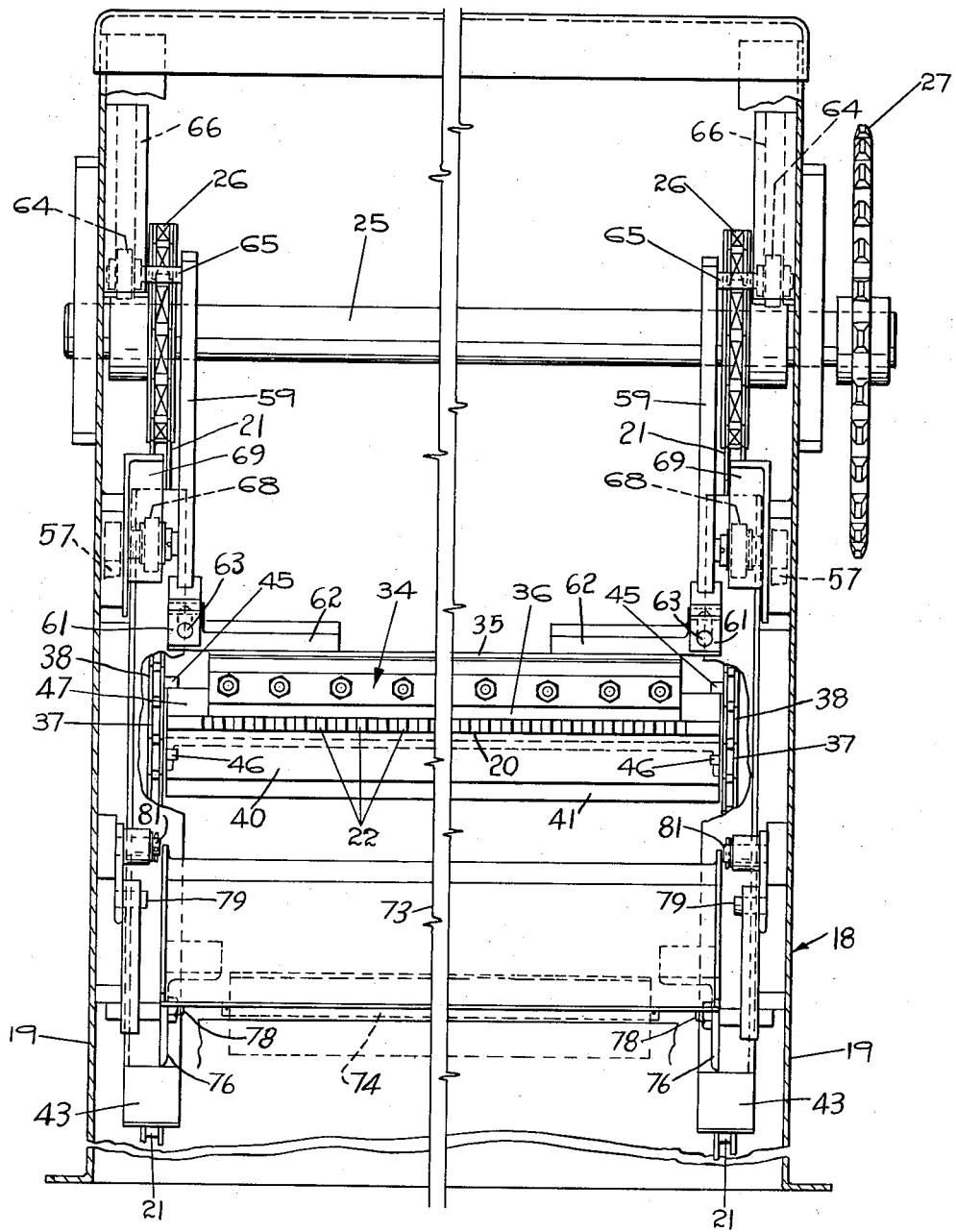

In the accompanying drawings:
FIG. 1 is a side elevational view of a screening apparatus embodying the instant invention;
FIG. 2 is a front elevational view of the screening apparatus;
FIG. 3 is a side elevational view of the wiper mechanism of the instant invention illustrating the positions of the various elements thereof at the instant of engagement of the rake structure with the endless drive chain;
FIG. 4 is a side elevational view of the wiper mechanism of the instant invention showing the positions of the various elements thereof at the instant of engagement of the rake with the wiper;
FIG. 5 is an illustration of the cam of the wiper operating mechanism; and
FIG. 6 is a front elevational view of the wiper mechanism of the instant invention.

Referring to the drawings, there is illustrated in FIGS. 1 and 2 the tank 10 of a sewage treatment plant provided with a screening apparatus 11 disposed in a screening chamber 12. The water flows in the tank 10 towards the screening chamber 12 and enters the latter through an inlet 13. The water leaves the screening chamber 12 through an outlet 14 oppositely disposed with respect to the water inlet 13. A stationary bar screen 15 is disposed in the screening chamber 12 in an upright position behind the water inlet 13. The bar screen comprises a plurality of individual bars 16 which are spaced from each other and disposed across the water inlet 13. Each of the bars 16 is secured to a foot member 17 which is anchored to the base of the tank 10. Each of the bars 16 extends upwardly from the foot member 17 in a cantilever manner with no other securing means being provided for the bars 16.

Above the screening chamber 12 there is provided a stationary frame forming a housing 18 for various elements of the screening apparatus 11, as will appear in greater detail hereinafter. The screening apparatus 11 includes a plurality of rakes 20 each of which is secured to a pair of endless chains 21 at spaced positions along the lengths thereof, and extending transversely between the chains 21. Each rake 20 is formed with a plurality of teeth 22 which are formed to closely interfit with the bars 16 of the bar screen 15. The teeth 22 of the rake 20 extend through the bars 16 and beyond the same, whereby the rake 20 is operative to remove trapped materials from the bar screen 15 as the rake is moved upwardly along the bar screen 15. There is always at least one rake 20 in engagement with the bar screen 15, whereby the teeth 22 of the rake 20 act to hold the individual bars 16 in properly spaced relation relatively to each other, and thus the rakes 20 effectively provide an auxiliary support for the cantilever bars 16.

At the bottom of the screening chamber 12 there is rotatably mounted a foot shaft 23 to which there is secured a pair of idler sprockets 24, one sprocket 24 being mounted on the shaft 23 near each end of the latter. The endless chains 21 are engaged with the sprockets 24 for guiding the movement of the endless chains 21 at the bottom of the screening chamber 12. In the top of the stationary frame or housing 18 there is rotatably mounted a head shaft 25 to which there is secured a pair of drive sprockets 26, one sprocket 26 being provided near each end of the shaft 25. The endless chains 21 are each engaged with a drive sprocket 26 to be driven by the latter. The endless chains 21 are driven in a clockwise direction, as viewed in FIG. 1, to move the rakes 20 upwardly along the bar screen 15, and beyond the top of the bar screen 15. The head shaft 25 projects beyond the housing 18 at one side of the latter and has a driven sprocket 27 secured thereto outside the housing 18. At the front of the housing 18 there is provided a bin 28, the top of which forms a platform for a drive motor 29 which drives a drive sprocket 30 connected by a suitable chain or like drive 31 to the driven sprocket 27 for driving the latter to operate the endless chains 21 through the drive sprockets 26.

The endless chains 21 move the rakes beyond the top of the bar screen 15 into the housing 18 in which there is a wiper mechanism 34 for clearing the rakes 20 of the materials. The wiper mechanism 34 includes a wiper 35 having a rubber blade 36 adapted to be drawn across the rake 20 to clear the materials off the rake 20. The wiper mechanism 34 is driven by a pair of endless drive chains 37, the latter being driven in timed relation to the chains 21 by the structure of the rakes 20, as will be explained in greater detail hereinafter. There is provided an endless drive chain 37 at each side of the housing 18, which drive chains 37 are identical, and the operating mechanisms associated with the drive chains 37 are likewise duplicated. Accordingly, the description will proceed with reference to only one of the drive chains 37 and its associated operating mechanism.

Each rake 20 is secured to a Z-bar 40 which extends laterally between the opposite chains 21. The Z-bar 40 is seated on a T-bar 41 which extends between and is secured to the opposite chains 21. In the area of the endless drive chain 37 there is provided a pair of spaced channels 42, 43 which form a guide track for the endless chain 21, and parallel a straight run of the endless drive chain 37 so that the chain 21 is guided in a straight line as it passes the drive chain 37, paralleling the straight run 38 of the drive chain 37.

At each of three equally spaced locations on the drive chain 37 there is provided a pair of spaced operating lugs 45, 46, which are engaged by the structure of the rake 20 as the latter is moved by the chain 21 past the drive chain 37. In FIG. 3 there is illustrated the wiper mechanism 34 at the instant that the structure of the rake 20 engages an operating lug 45 of the drive chain 37. The upstanding leg 47 of the Z-bar is disposed in line with the straight run 38 of the drive chain 37, and engages the operating lug 45 of the drive chain 37, and as the movement of the rake 20 continues upwardly, the drive chain 37 is driven in a clockwise direction. Then as the operating lug 46 moves upwardly into the straight run 38 of the drive chain 37, it engages the underpart of the T-bar 41, and by engagement therewith prevents the drive chain 37 from overriding, or getting ahead of the rake 20. In this manner the operation of the drive chain 37 is timed in accordance with the movement of the rake 20.

The drive chain 37 is operatively engaged with upper and lower sprockets 48, 49, respectively, which are rotatably mounted on the side wall 19 of the housing 18 by shafts 50, 51, respectively, in any suitable manner. A cam 52 is secured to the shaft 51 to be rotated by the latter in a clockwise direction. A follower lever 53 is oscillatably mounted by a pivot pin 54 on a bracket 55 secured to the side wall 19 of the housing 18. The follower lever 53 has a follower roller 56 at one end, which is engaged with the cam 52 for oscillation of the follower lever 53 by the cam 52. An operating lever 57 has one end pivotally connected to the opposite end of the follower lever 53 by a pivot pin 58. The opposite end of the operating lever 57 is pivotally connected to a wiper arm 59 by a pivot pin 60. At the lower end of the wiper arm 59 there is provided a clevis 61 in which is received an ear 62 of the wiper 35. The ear 62 is connected to the clevis 61 by a pivot pin 63. Since the wiper 35 is secured to a wiper arm 59 by a pivot pin 63 at each end of the wiper 35, there is provided a feature of adjustability of the wiper 35 to assure full contact of the wiper 35 with the rake 20. At the upper end of the wiper arm 59 there is provided a guide roller 64 rotatably secured to the wiper arm 59 on a pin 65. The guide roller 64 rides upwardly and downwardly between channels 66, 67, carried by housing 18 and which together form an upright track and constrain the movement of the wiper 35. The pin 60 by which the operating lever 57 is secured to the wiper arm 59 rotatably mounts a support roller 68 which is adapted to ride on a supporting track 69 for the purpose of supporting the wiper 35.

As seen in FIG. 3, at the instant that the structure of the rake 20 engages the drive chain 37, the wiper 35 is disposed in an idle position beyond the path of movement of the rake 20 and clearing the latter. Upon operation of the drive chain 37 the cam 52 is rotated in a clockwise direction and the follower roller 56 rolls along the cam periphery a–b (FIG. 5) as a result of which there is oscillation of the follower lever 53 in a clockwise direction causing the operating lever 57 to move to the right as viewed in FIG. 3, and thereby moving the wiper 35 in the same direction, bringing the latter into the path of movement of the rake 20 for engagement therewith. As the wiper 35 is moved into the path of movement of rake 20 the support roller 68 rides downwardly along the supporting track 69 and supports the wiper 35. The wiper arm 59 moves downwardly and the guide roller 64 rides down along the channels 66, 67 concurrently, and serve to constrain the movement of the wiper 35.

During continued rotation of the cam 52 the follower roller 56 rolls along the peripheral portion b–c of the cam 52, which is a concentric portion of the cam 52, and thereby causes the various operating elements and the wiper 35 to dwell. In FIG. 4 there is illustrated the positions of the various elements of the wiper mechanism 34 when the follower roller 56 is in engagement with the cam 52 at point c on the cam periphery. In this position of the elements of the wiper mechanism 34 the wiper 35 has been moved to its ultimate position in the path of movement of the rake 20 and is supported on the supporting track 69. Also, the rake 20 has moved upwardly through such distance that it is in contact with the rubber blade 36 of the wiper 35. Upon continued rotation of the cam 52, during which the follower roller 56 rolls along the peripheral portion c–d of the cam 52, the follower lever 53 is oscillated in a counterclockwise direction thereby moving the operating lever 57 to the left, as viewed in FIG. 4, and drawing the wiper 35 across the rake 20 to clear the materials from the latter. It will be understood that as the wiper 35 is drawn across the rake 20 the latter continues its upward movement. The rake 20 by engagement with the wiper 35 moves the latter upwardly. The supporting roller 68 may rise above the supporting track 69, since the wiper 35 is supported by the rake 20 during the upward movement of the wiper 35 by the rake 20. As the wiper 35 moves beyond the end of the rake 20, the supporting roller 68 will return to engagement with the supporting track 69, whereby the latter will again function to support the wiper 35. During all of the movement of the wiper 35, the wiper arm 59 serves to constrain the movement of the wiper 35.

When the cam 52 has rotated to the position where the follower roller 56 is in engagement with point d on the cam periphery, the wiper 35 is disposed beyond the end of the rake 20 in the position illustrated in FIG. 3, thereby permitting continued movement of the rake 20 clear of the wiper 35. During continued rotation of the cam 52, the follower roller 56 rolls along peripheral portion d–a of the cam 52, which is a concentric portion of the cam 52, whereby there is no motion produced of the operating elements and the wiper 35 dwells in its idle position. The cycle is terminated with the follower roller 56 in engagement with the periphery of cam 52 at point a thereof. At this point the upstanding leg 47 of the Z-bar 40 disengages from the operating lug 45, as illustrated in broken lines in FIG. 3, and the movement of the rake 20 continues beyond the wiper mechanism 34. The spacing of the rakes 20 along the chains 21 is greater than the spacing of the operating lugs 45, 46 on the drive chain 37, so that there is a time lag between the disengagement of one rake 20 from the drive chain 37, and the engagement of a successive rake 20 with the drive chain 37, the latter to initiate a second cycle like the one hereinabove described.

Below the wiper 35 there is provided a deflector plate or chute 73 which is pivotally connected to the housing 18 by a hinge 74 at the bottom of a discharge opening 75 through which the materials cleared from the rake 20 are discharged into the bin 28. An arm 76 is secured to the underside of the deflector plate 73. An operating lever 77 is pivotally connected at one end thereof to the arm 76 by a pivot pin 78, and the opposite end of the operating lever 77 is pivotally connected by a pivot pin 79 to one end of follower lever 80. The follower lever 80 is oscillatably supported on a pivot pin 81 secured to the side wall 19 of the housing 18. The opposite end of the follower lever has rotatably mounted thereon a follower roller 82 which is in engagement with the periphery of the cam 52.

At the instant that the structure of the rake 20 engages the operating lug 45 of the drive chain 37, the follower roller 82 is in engagement with the cam 52 in the concentric portion $d$–$a$ thereof, and the deflector plate 73 is maintained in a position clear of the path of movement of the rake 20 to permit movement of the latter past the deflector plate 73 in an upward direction. During continued rotation of the cam 52 the follower roller 82 rolls along the cam peripheral portion $a$–$b$ which produces oscillation of the follower lever 80 in a counterclockwise direction, bringing the deflector plate 73 to the position thereof shown in FIG. 4 in which it is disposed behind the rake 20, and the materials cleared from the latter will drop onto the deflector plate 73 for discharge into the bin 28. The follower roller 82 subsequently rolls along the cam peripheral portion $b$–$c$, which is a concentric portion of the cam 52, whereby there is no motion of the follower lever 80, and the deflector plate 73 dwells in the position thereof shown in FIG. 4. During continued rotation of the cam 52 the follower roller 82 rolls along cam peripheral portion $c$–$d$ the follower lever is oscillated in a clockwise direction, moving the deflector plate 73 out of the path of movement of the rake 20, to its idle position in which it clears the path of movement of the rake 20 to permit movement of a rake 20 past the deflector plate 73.

By this invention there is provided an improved wiper mechanism that is positively operated in timed relation to the movement of the rake, to draw the wiper across the rake during continued movement of the latter for clearing materials from the rake. The operation of the wiper is initiated by movement of the rake, with the operating mechanism for the wiper being driven from the rake structure to produce the timed operation. There is also provided the deflector plate behind the rake for reception of the materials cleared from the rake, and an operating mechanism for the deflector plate to move it to a position in which it clears the path of movement of the rake to permit continued movement of the latter. The operation of the deflector plate is also timed, so that after the rake has moved past the deflector plate the operating mechanism acts to move the deflector plate to a position behind the rake in the path of movement of the latter. The wiper mechanism disclosed herein is a compact, positively acting structure, which is cooperative with the rake to clear materials from the latter in a highly efficient manner.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. An apparatus for screening material from a flowing stream of water comprising a stationary frame, a screen disposed in the path of flow of said stream of water to trap material carried by the stream of water, a rake for removing the trapped material from the screen, driven means connected to the rake for moving the rake into engagement with the screen and along the screen to remove the material therefrom, said driven means also moving the rake upwardly beyond the screen to carry the material away from the screen, a wiper disposed beyond the screen to be operative with the rake to remove the material from the rake, an operating mechanism operatively connected to said wiper for drawing the wiper across the rake and beyond the rake to a position out of the path of movement of the rake to permit the rake to move past the wiper, a drive for positively actuating said operating mechanism, means for operating said drive by engagement of the driven means with said drive for drawing the wiper across the rake and to a position beyond the path of movement of the rake during continued movement of the rake, and guiding means for said wiper carried by said stationary frame independently of said rake, said guiding means including means whereby said wiper is free to move upwardly while in wiping contact with said rake and at the same time wipes across the rake to remove material therefrom until it moves beyond the rake as above set forth.

2. An apparatus for screening material from a flowing stream of water comprising a stationary frame, a bar screen disposed in the path of flow of said stream of water to trap material carried by the stream of water, a rake for removing the trapped material from the bar screen, an endless chain connected to the rake for moving the rake into engagement with the bar screen and along the bar screen to remove the material therefrom, said endless chain also moving the rake beyond the bar screen to carry the material away from the bar screen, a wiper mounted on said stationary frame and disposed beyond the bar screen in a position to be engaged by the rake to remove the material therefrom, an operating mechanism including a lever operatively connected to the wiper for drawing the wiper across the rake, means including a wiper arm connected to the wiper and engaged with a guide on said stationary frame for constraining movement of the wiper while providing for the wiper upon being engaged by the rake to be moved with and by the rake in the direction of movement of the rake while being drawn across said rake as aforesaid, a drive for positively actuating the lever of said operating mechanism, and said rake and drive including interengaging means by which the drive is operated in accordance with the movement of the rake beyond the bar screen.

3. An apparatus for screening material from a flowing stream of water comprising a stationary frame, a bar screen disposed in the path of flow of said stream of water to trap material carried by the stream of water, a rake for removing the trapped material from the bar screen, an endless chain connected to the rake for moving the rake into engagement with the bar screen and along the bar screen to remove the material therefrom, said endless chain also moving the rake beyond the bar screen to carry the material away from the bar screen, a wiper mounted on said stationary frame and disposed beyond the bar screen in a position to be engaged by the rake to remove the material therefrom, means mounting the wiper whereby it is in engagement with the rake for movement of the wiper by the rake in the direction of movement of the rake, an operating mechanism connected to said wiper for drawing the wiper across the rake as the wiper is moved by the rake in the direction of movement of the rake, a drive for positively actuating said operating mechanism, and said rake and drive including interengaging means by which the drive is operated in accordance with the movement of the rake beyond the bar screen.

4. An apparatus for screening material from a flowing stream of water comprising a bar screen disposed in the path of flow of said stream of water to trap material carried by the stream of water, a rake for removing the trapped material from the bar screen, an endless chain connected to the rake for moving the rake into engagement with the bar screen and along the bar screen to remove material therefrom, said endless chain also moving the rake beyond the bar screen to carry the material away from the bar screen, a wiper disposed beyond the bar screen in a position to be engaged by the rake to remove the material therefrom, an operating mechanism connected to said wiper for drawing the wiper across the rake, a drive for positively actuating said operating mechanism, and said rake and drive including interengaging means by which the drive is operated in accordance with the movement of the rake beyond the bar screen, a deflector plate normally disposed out of the path of movement of the rake, another operating mechanism connected to said deflector plate for moving the deflector plate into the path of movement of the rake behind the rake for the discharge of material from the rake onto the deflector plate, said other operating mechanism also being connected to the drive to be driven by the drive.

5. An apparatus for screening material from a flowing stream of water comprising a bar screen disposed in the path of flow of said stream of water to trap material carried by the stream of water, a rake for removing the trapped material from the bar screen, an endless chain connected to the rake for moving the rake into engagement with the bar screen and along the bar screen to remove material therefrom, said endless chain also moving the rake beyond the bar screen to carry the material away from the bar screen, a wiper disposed beyond the bar screen in a position to be engaged by the rake to remove the material therefrom, an operating mechanism connected to said wiper for positively drawing the wiper across the rake, said operating mechanism including a cam and a linkage connecting said cam to be positively operated by the cam, said linkage being connected to the wiper to positively draw the wiper across the rake, a drive for positively connecting said elements of said operating mechanism, said rake and drive including interengaging means by which the drive is operated in accordance with the movement of the rake beyond the bar screen, a hinged deflector plate normally disposed out of the path of movement of the rake, an operating mechanism for the deflector plate including a linkage connected to said deflector plate and positively operated by the cam for swinging the deflector plate into the path of movement of the rake behind the rake for discharge of material from the rake onto the deflector plate.

References Cited in the file of this patent
UNITED STATES PATENTS

| | | |
|---|---|---|
| 2,128,347 | Briggs | Aug. 30, 1938 |
| 2,634,863 | Hauer | Apr. 14, 1953 |
| 2,671,563 | Benner | Mar. 9, 1954 |
| 2,978,105 | Poheim | Apr. 4, 1961 |

FOREIGN PATENTS

| | | |
|---|---|---|
| 585,472 | Great Britain | Feb. 7, 1947 |